Figure 1:
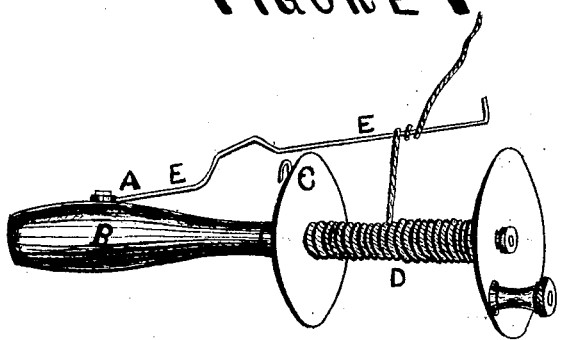

G. G. Sheldon,

Kite String Holder.

No. 103,668.   Patented May 31, 1870.

WITNESSES.                INVENTOR.

G. N. Frost              George G. Sheldon
S. T. Powers             By Farwell, Ellsworth & Co
                              Attorneys.

United States Patent Office.

GEORGE G. SHELDON, OF CHICAGO, ILLINOIS.

Letters Patent No. 103,668, dated May 31, 1870.

IMPROVEMENT IN KITE-STRING HOLDERS.

The Schedule referred to in these Letters Patent and making part of the same

*To all whom it may concern:*

Be it known that I, GEORGE G. SHELDON, of Chicago, in the county of Cook and State of Illinois, have invented a new Kite-String Holder; and I do hereby declare that the following is a full and exact description thereof, reference being had to the accompanying drawing and to the letters of reference marked thereon.

The nature of my invention consists in providing a spool for winding up or paying out a line with an apparatus for checking or stopping its motion at any desired point.

To enable others skilled in the art to make and use my invention, I will describe its construction and operation.

I construct my spool, D, upon a handle, B, in the usual way.

Upon the periphery of the spool-head I attach a hook, C, extending beyond said periphery, with the end curving forward in the line of revolution of the spool.

Upon the handle at A, I attach a curved wire spring, E E, as shown in the figure. This device runs forward to the end of the spool, with its end turned out at a right angle, for purposes hereafter to be explained.

This spring, when at rest, stands out sufficiently far from the hook C upon the spool-head to allow the said spool to rotate freely when paying out the line, but, when enough line is out, the operator can at once arrest the spool by bearing down the spring with his thumb, so that the hook shall catch it.

Thus the escape of the line is at all times easily regulated in its escape or detention, without slipknots or entanglements of any sort, making a very simple and practical arrangement for handling all kinds of lines in kite-flying, fishing, carpentery, masonry, land measuring, or any other important purpose to which lines or measuring-tapes are applied.

Claim.

What I claim as my invention, and desire to secure by Letters Patent, is—

The bent spring E, and hook C, in combination with the spool and its handle, substantially as described for the purpose specified.

GEORGE G. SHELDON.

Witnesses:
 D. I. POWERS,
 G. H. FROST.